2 Sheets—Sheet 1.
E. H. JANNEY.
Car-Buffer.
No. 215,363. Patented May 13, 1879.
Fig. 1.
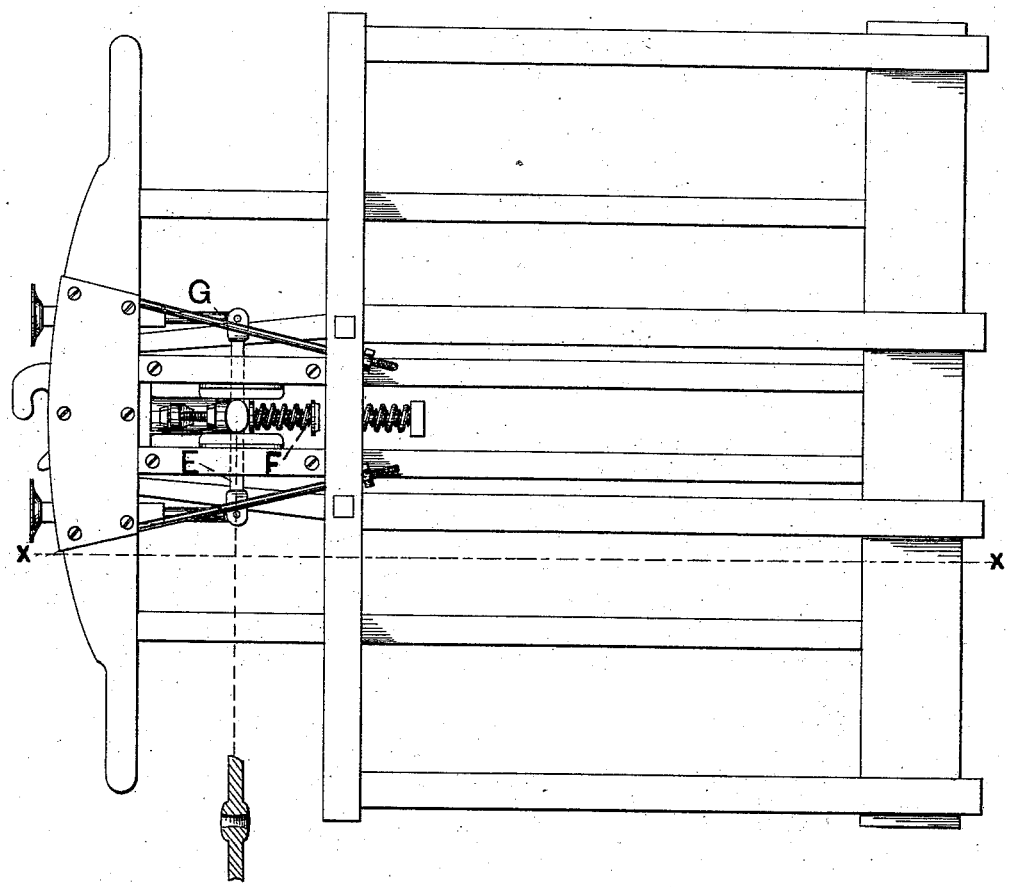
Fig. 2.
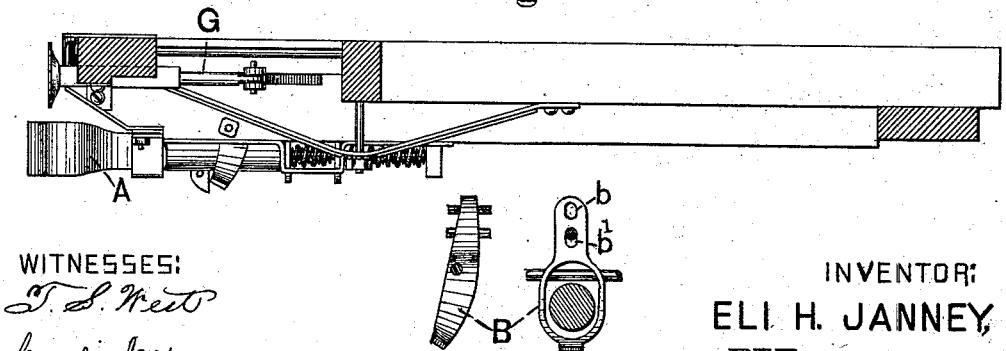
Fig. 3.
WITNESSES:
T. S. West
Cornelius Coot
INVENTOR:
ELI H. JANNEY
BY
H. W. Beadle & Co.
ATTYS.

2 Sheets—Sheet 2.
E. H. JANNEY.
Car-Buffer.
No. 215,363. Patented May 13, 1879.
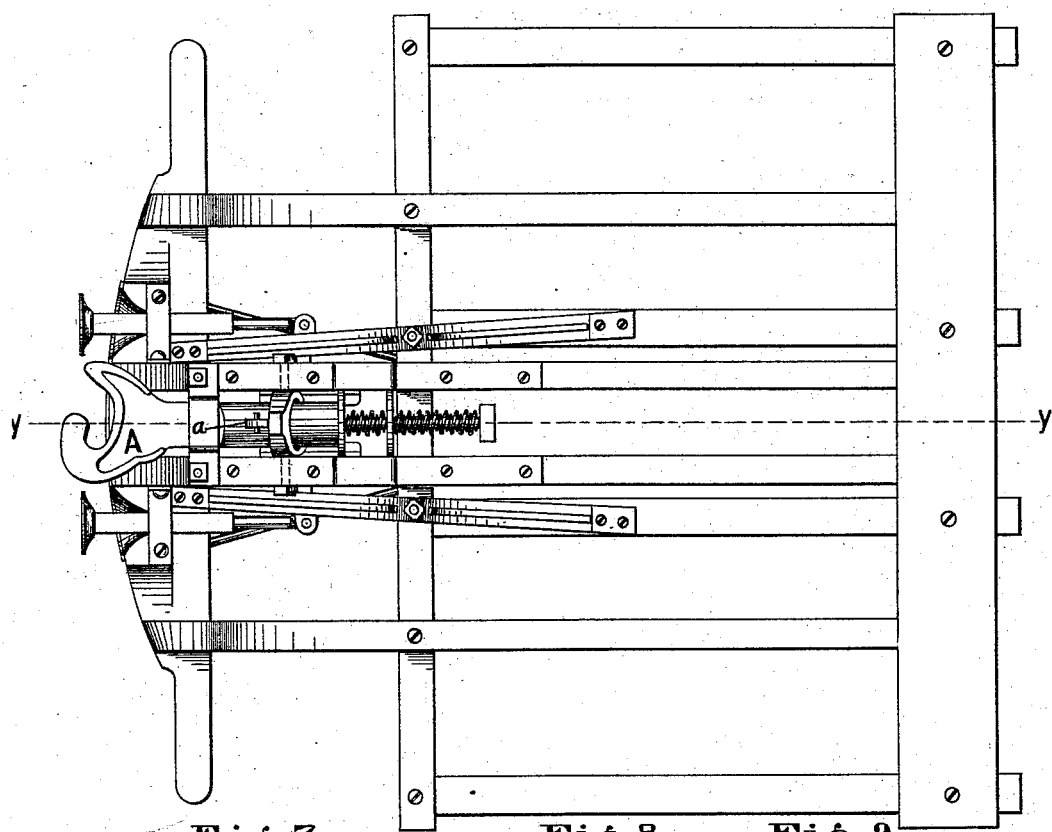
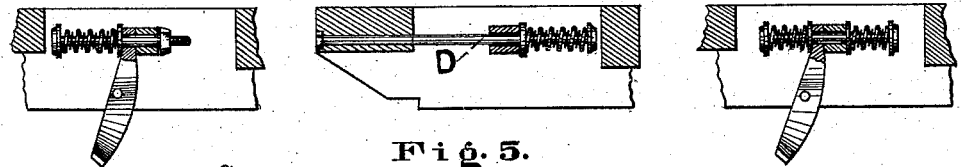
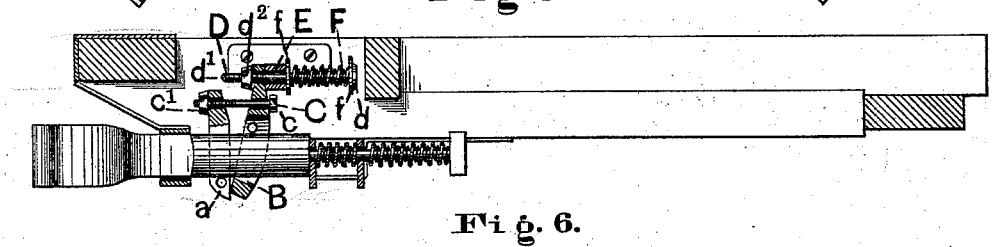
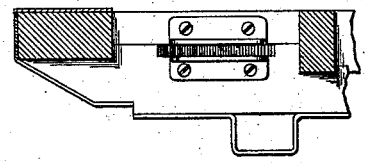
WITNESSES:
T. S. West.
Cornelius Cox.
INVENTOR:
ELI H JANNEY,
BY H. W. Beadle & Co.
ATTYS.

UNITED STATES PATENT OFFICE.

ELI H. JANNEY, OF ALEXANDRIA, VIRGINIA.

IMPROVEMENT IN CAR-BUFFERS.

Specification forming part of Letters Patent No. 215,363, dated May 13, 1879; application filed January 28, 1879.

*To all whom it may concern:*

Be it known that I, ELI H. JANNEY, of Alexandria, county of Alexandria, and State of Virginia, have invented an Improvement in Buffers; and I do hereby declare that the following is a full and exact description of the same, reference being had to the accompanying drawings, and to the letters of reference marked thereon.

This invention consists mainly, first, in the combination, with suitable coupling mechanism for centrally uniting the cars together, of an equalizing-bar attached to buffer-shanks, and a central spring for controlling the movement of the equalizing-bar in a longitudinal direction; and, second, in the combination, with other parts, of an intermediate yoke-lever, as will be fully described hereinafter.

In the drawings, Figure 1 represents a plan view of my invention as applied to the framework of a railroad-car; Fig. 2, a longitudinal section upon the line $x\,x$, Fig. 1; Fig. 3, detail views of the yoke-lever; Fig. 4, a plan view of Fig. 1 reversed; Fig. 5, a longitudinal section upon the line $y\,y$, Fig. 4; Fig. 6, a detail view enlarged; and Figs. 7, 8, and 9, various modifications hereinafter described.

To enable others skilled in the art to make and use my invention, I will now proceed fully to describe the construction of the same and the manner of its operation.

This invention will be first described as it is used in connection with the yoke-lever.

A, Figs. 2 and 4, represents the coupling constructed generally in any proper manner, but preferably as described in my previous patents.

$a$, Fig. 5, represents a stud or horn extending through the coupler-shank, as shown in Fig. 4, and projecting above and below the same, as shown in Fig. 5.

B, Figs. 3 and 5, represents a yoke-lever pivoted to the car-platform, as shown in Fig. 5, the lower end of which bears against the lower projection of the horn, as shown. This yoke-lever is substantially like that described in my patent of April 8, 1879, the construction being changed only in some minor details, as will be fully described hereinafter.

$b$, Fig. 3, represents an opening through the lever at or near its upper end, which is adapted to receive the bolt D, Fig. 5, hereinafter referred to; and $b'$, an opening located between the upper opening, $b$, and the pivot-point of the lever, which is adapted to receive the bolt C, Fig. 5, as shown.

The bolt C, Fig. 5, it will be observed, extends through the opening $b'$, Fig. 3, in the yoke-lever, and also through a proper opening in the upper projection of the horn $a$ of the coupling, as shown, and unites the two together by means of its head $c$ and nut $c'$, as shown. When these parts are in their proper normal position, the stud or horn $a$ of the coupling bears against the nut $c'$ of the bolt, as shown in Fig. 5, and hence any forward movement of the former will give movement to the latter, and draw forward the upper end of the yoke-lever B. A backward movement of the stud, however, beyond its normal position will not be communicated to the bolt, because the former, by means of its opening, simply moves along the latter without active contact with it.

D, Fig. 5, represents the bolt before referred to, extending through the opening $b$, Fig. 3, of the yoke-lever B, which said bolt is provided at one end with the head $d$, and at the other end with the threaded end $d^1$ and nut $d^2$, as shown.

E, Figs. 1 and 5, represents the equalizing-bar, having a central opening, through which passes the bolt D, and end openings, by means of which connection is made with the rear ends of the buffer-shanks, as shown in Fig. 1.

F, Figs. 1 and 5, represents a spring of any proper construction, encircling the bolt D; and $f\,f$, washers forming proper bearings for its ends, as shown.

G G represent the buffer-shanks, which may be of any proper construction.

The operation is substantially as follows: Any movement of the coupler from its normal position, either in a forward or in a rearward direction, will give movement to the upper end of the yoke-lever in a forward direction. This movement of the yoke-lever is directly communicated to the bolt D, and from the bolt D, by means of the intermediate spring, F, to the equalizing-bar E and buffer-shanks G.

The spring F, it will be understood, is an elastic connection, which is interposed between the coupling and buffing mechanisms for the purpose of permitting the increased movement of the upper end of the yoke-lever without the breakage of any part. This will be understood when it is considered that if the yoke-lever were rigidly united to the equalizing-bar and buffer-shanks, its increased movement over that of the coupling would be directly communicated to the buffer-heads, which are in close contact with those of the opposite car, and hence the breakage of some part must occur. By means of the intermediate elastic connection the increased movement of the yoke-lever is communicated to the buffer-heads as increased pressure.

If desired, the spring F may be located in front of the yoke-lever, as shown in Fig. 7; or two may be employed, one in front and one in rear, as shown in Fig. 9.

When the invention is used without the yoke-lever, as shown in Fig. 8, the bolt or rod D, for supporting the spring and equalizing-bar, is secured to the frame-work of the car.

Having thus described my invention, what I claim as new, and desire to secure by Letters Patent, is—

1. In combination with suitable coupling mechanism for centrally uniting the cars together, the following elements: an equalizing-bar attached to buffer-shanks, and a central spring for controlling the movement of the equalizing-bar in a longitudinal direction, substantially as described.

2. In combination with coupling mechanism, substantially as described, and buffing mechanism, substantially as described, a yoke-lever and central spring, substantially as described.

3. In combination with an equalizing-bar rigidly united to the buffer-shanks, as far as longitudinal movement is concerned, a yoke-lever, B, bolt D, and spring F, as described.

This specification signed and witnessed this 22d day of January, 1879.

ELI H. JANNEY.

Witnesses:
 JOSEPH PADGETT,
 H. W. BEADLE.